United States Patent [19]

Johnson

[11] Patent Number: 4,490,255
[45] Date of Patent: Dec. 25, 1984

[54] COMBINED SETTLING AND LIQUID STORAGE TANK

[75] Inventor: Robert W. Johnson, Mount Prospect, Ill.

[73] Assignee: United Conveyor Corporation, Deerfield, Ill.

[21] Appl. No.: 457,465

[22] Filed: Jan. 12, 1983

[51] Int. Cl.$^3$ ............................................... B01D 21/00
[52] U.S. Cl. .................................. 210/256; 210/257.1; 210/519; 210/532.1; 210/534; 210/536
[58] Field of Search ............ 210/114, 255, 256, 257.1, 210/301, 519, 521, 532.1, 533, 534, 535, 536, 537, 538; 405/87, 88, 104

[56] References Cited

U.S. PATENT DOCUMENTS

| | | | |
|---|---|---|---|
| 976,923 | 11/1910 | Rothwell | 210/301 X |
| 3,147,221 | 9/1964 | Johnston | 210/519 |
| 3,349,030 | 10/1967 | Savage | 210/256 X |
| 3,796,321 | 3/1974 | Kosonen | 210/256 X |
| 3,849,311 | 11/1974 | Jakubek | 210/537 X |
| 3,864,257 | 2/1975 | Shaffer | 210/525 X |
| 3,971,719 | 7/1976 | Peters | 210/114 X |
| 4,122,016 | 10/1978 | Tao et al. | 210/537 X |

OTHER PUBLICATIONS

"United Ash Sluicing System", (6S–64R, ©1964), pp. 8 and 9.
United Conveyor Corporation Blueprint, Drawing No. 523-54171-6 (1968).
United Conveyor Corporation Blueprint, Drawing No. 528-4351-4 (1976).
United Conveyor Corporation "Utility Bottom Ash Conveyor Systems", (©1981), p. 9.

Primary Examiner—Richard V. Fisher
Assistant Examiner—W. Gary Jones
Attorney, Agent, or Firm—Wood, Dalton, Phillips, Mason & Rowe

[57] ABSTRACT

A cylindrical storage tank of large diameter and depth is concentrically surrounded by a settling tank that has a width to internal diameter ratio that provides essentially plug flow. Liquid containing suspended particles capable of separation by settling is introduced into the upper part of a body of liquid in the settling tank at a zero radius of the tank at a controlled rate and flows slowly in both directions around the storage tank to a weir which extends no more than about halfway around the storage tank and is bisected by a 180° radius of the tank. A slurry of particle-laden liquid is drawn from the lower part of the settling tank, and relatively particle-free surface liquid flows over the weir into the storage tank from which it is drained at a controlled rate.

19 Claims, 4 Drawing Figures

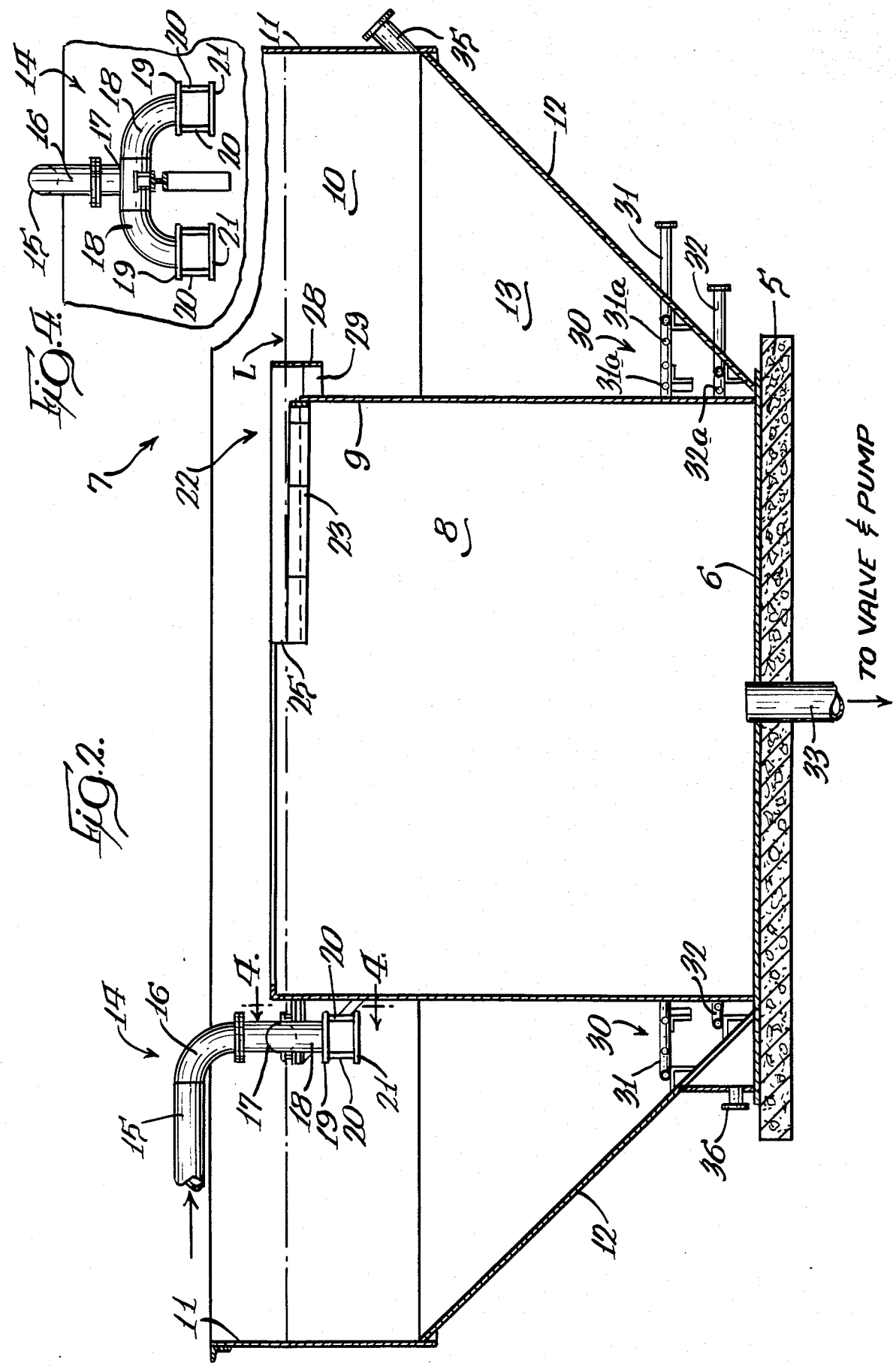

1

COMBINED SETTLING AND LIQUID STORAGE TANK

BACKGROUND OF THE INVENTION

There are a number of industrial operations in which suspended particles must be separated from a liquid by settling, because the circumstances are not suitable for separation by screening, filtration or centrifuging. Separation by settling is usually the only practical expedient where the volume of liquid is large.

One major use for this type of equipment is in the handling of ash produced by solid fuel or refuse burning steam generating plants which, in the case of large plants, produce many tons of ash a day that is commonly transported in a water sluice conveyor to a dewatering tank or pond where the water is separated from the larger solid material and must then have the smaller particles removed by settling. The continuous production of ash in such plants requires a dynamic—i.e., continuous flow—system; and the distance of travel needed for continuous flow settling has resulted in such systems requiring an inordinate amount of space and construction material.

There have been systems in which the water-containing suspended particles have been introduced into the center of a large combination settling and surge or storage tank, with the particles settling in the center area of the tank and the relatively particle-free water flowing over a weir at the rim of the tank into an outflow channel. Such a unit, if it is to be adequate for the ash output from a single large furnace must be much larger in diameter than is desirable. Furthermore, like most settling units for the purpose, it must be elevated a substantial distance above ground level. Another common system utilizes a series of tanks with liquid flow from one to another and separate settling and storage. This requires a large head to sustain flow from one tank to another.

SUMMARY OF THE INVENTION

In accordance with the present invention, a combined settling and liquid storage tank includes a cylindrical storage tank having a circumferential wall of large diameter and depth, and an annular settling tank which concentrically surrounds the storage tank and has a ratio of width to internal circumference which produces plug flow as hereinafter defined. A small area in the vicinity of a zero radius of the settling tank is occupied by an infeed which introduces, at controlled velocity into the uppermost part of a body of liquid in the settling tank, a liquid containing suspended fine particles which may settle out of said liquid. An overflow weir over which liquid may pass at low velocity from the upper part of the body of liquid directly into the storage tank surrounds no more than about half the circumference of the storage tank and is bisected by a 180° radius of the settling tank, and the weir comprises a flow metering plate which is concentric with the storage tank circumferential wall. There is means for removing settled particles from the lower portion of the settling tank, and also means for removing liquid from the storage tank.

Preferably the weir has an upper margin that is lowest at the 180° radius of the settling tank and increases gradually in height toward both its ends so as to maximize the distance to be traversed by liquid between the infeed and the overflow. Only a very small height differential is needed between the ends of the weir and its lowermost point.

In order to minimize disturbance of the liquid in the settling tank, the infeed is provided with baffle plate means that spreads the flow of liquid from the infeed laterally and reduces local currents which would otherwise tend to interfere with settlement of particles close to the infeed discharge end; and the particles which settle to the lower part of the settling tank are drawn off in the form of a heavy slurry through tiers of discharge pipes, each of which has a multiplicity of slurry withdrawal openings.

THE DRAWINGS

FIG. 2 is a sectional view on an enlarged scale taken substantially as indicated along the line 2—2 FIG. 1;

FIG. 4 is a fragmentary sectional view taken substantially as indicated along the line 4—4 of FIG. 2.

THE PREFERRED EMBODIMENT OF THE INVENTION

Figure 1:
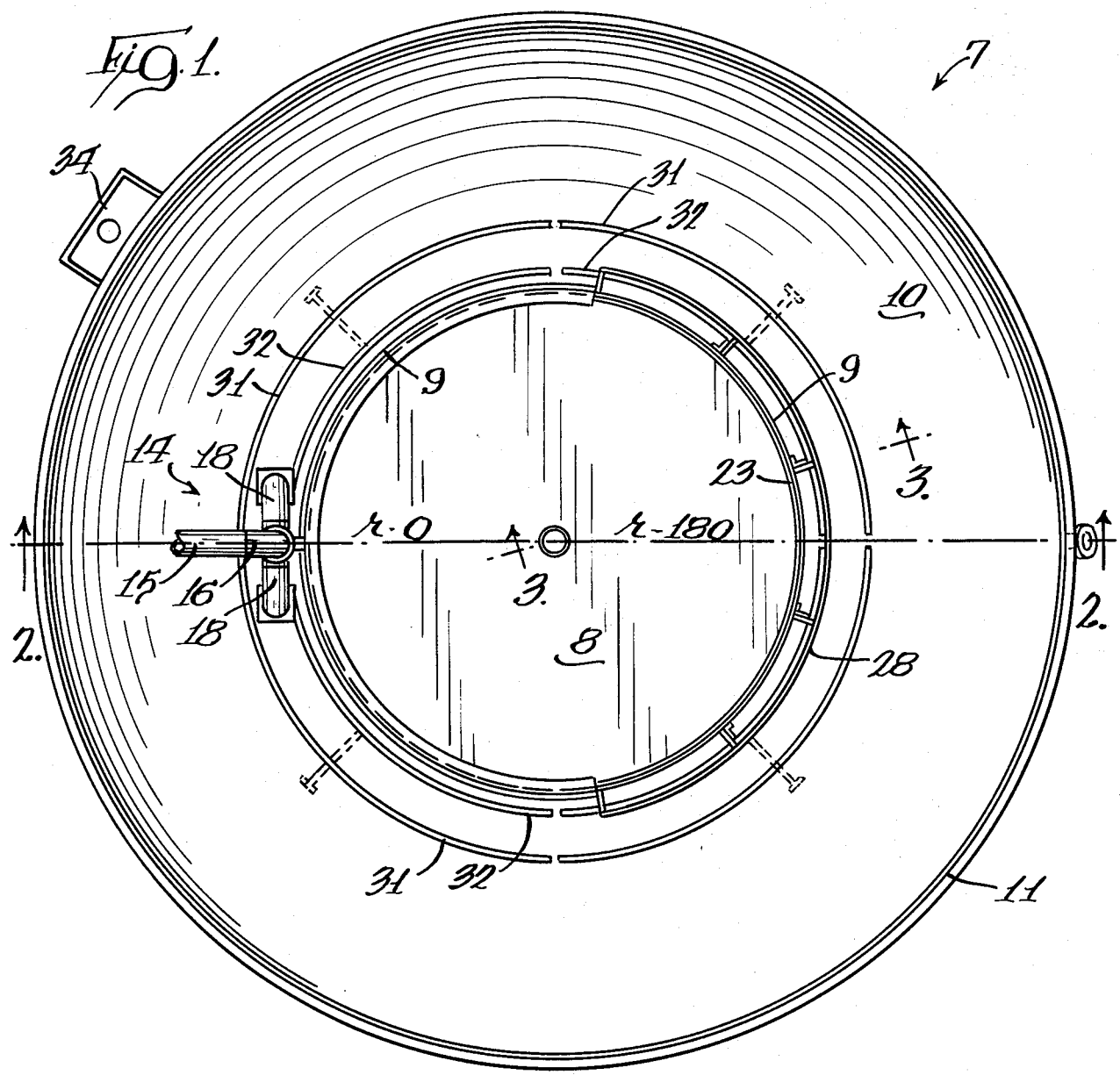
FIG. 1 is a plan view of apparatus embodying the invention.

Referring to the drawings in detail, a concrete slab base 5 which may be at ground level supports a bottom plate 6 of a combined settling and liquid storage tank, indicated generally at 7.

The settling and liquid storage tank 7 includes a cylindrical storage tank 8 which has a circumferential wall 9 of large diameter and depth.

The wall 9 defines the inner circumference of an annular settling tank 10 which has an outer circumferential wall 11 and a lower outer wall 12 which is inclined toward the circumferential wall 9 at about 45° so that a lower part 13 of the settling tank is frustoconical. Both the circumferential wall 9 of the storage tank and the lower outer wall 12 of the settling tank are welded at their lower ends to the bottom plate 6.

Liquid containing suspended fine particles which may settle out of the liquid is introduced at controlled velocity into the uppermost part of a body of liquid in the settling tank 10, the surface of the liquid being L in FIG. 2. Introduction of the liquid is by an infeed, indicated generally at 14, that includes a pipe 15 which, in an ash handling system, receives the effluent water and suspended fine particles from a dewatering bin or pond. The pipe 15 has an elbow 16 which connects with a tee 17 from which a pair of infeed elbows 18 extend laterally and downwardly and have discharge ends which are provided with mounting plates 19. Suspended from each of the plates 19 by means of four mounting bolts 20 are baffle plates 21 which are operatively associated with the discharge ends of the elbows 18 to spread the flow of liquid from the infeed laterally and reduce local currents which would tend to interfere with settlement of particles close to the infeed discharge end. The discharge ends of the elbows 18 are seen in FIGS. 1 and 4 to be equidistant from a line segment defining a zero radius r-0 of the settling tank 10, so the infeed occupies a small area in the vicinity of said zero radius.

Figure 3:
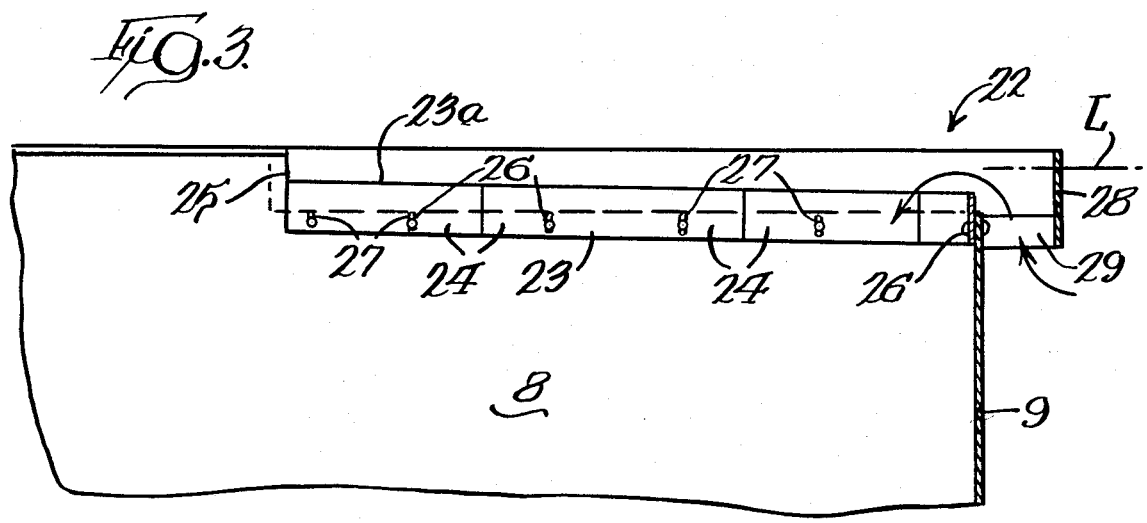
FIG. 3 is a fragmentary sectional view on an enlarged scale taken substantially as indicated along the line 3—3 of FIG. 1.

At the side of the circumferential wall 9 remote from the infeed 14 is a weir, indicated generally at 22, which occupies a major part of half the circumference of the storage tank 8 and is bisected by a line segment defining a 180° radius r-180 of the settling tank. The weir 22 comprises a flow metering plate 23 consisting of several, in the drawings eight, arcuate plate members 24 that are mounted end-to-end in a weir notch 25 that occupies 160° of the circumferential wall 9. As best seen in FIG. 3, the metering plate members 24 are secured to the circumferential wall 9 by means of bolts 26 which traverse upright slots 27 in the metering plate members so that each of the members is individually adjustable to change both its height and its angle relative to the plane of the top margin of the circumferential wall in the weir notch 25. As seen in FIG. 3, the top margin 23a of the metering plate 23 has a low point at the radius r-180 and is progressively higher from that radius toward its two extremities at the ends of the notch 25. This causes somewhat faster overflow from the settling tank 10 into the storage tank 8 at the radius r-180, and thus tends to maximize the distance traveled by liquid in the settling tank 10.

The weir also includes an arcuate baffle 28 which is supported on the circumferential tank wall 9 by means of a plurality of brackets 29. The baffle prevents liquid from reaching the weir except from below and retains flotsam.

The apparatus also includes means, indicated generally at 30, for removing settled particles from the lower portion of the settling tank. The particle removal means 30 consists of an upper tier of pipes 31 and a lower tier of pipes 32 which extend entirely around the lowermost portion of the settling tank 10, and each of the pipes 31 and 32 is provided with a respective multiplicity of holes 31a and 32a through which a fairly heavy slurry consisting of liquid and settled particles may pass into the respective pipes 31 and 32. The pipes are connected to a pump, preferably a slurry pump.

Means for removing liquid from the storage tank 8 consists of a pipe 33 which is in the bottom of the storage tank and is connected to a valve and a pump (not shown). Thus, the rate of removal of liquid from the storage tank 8 may be controlled by operation of the valve and pump.

Referring to FIG. 1, the settling tank 10 is provided with an emergency overflow drain 34. As seen in FIG. 2, the settling tank 10 is also provided with one or more sluicing liquid supply pipes 35 and one or more sluicing liquid discharge pipes 36 which may be used if it becomes necessary to drain the settling tank and clean collected sludge out of the bottom of it. This is likely to be required only for equipment maintenance, or if there is a malfunction in the means 30 for removing settled particles from the lower portion of the settling tank 10 which results in a build-up of sludge. It is apparent that a small mass of settled particles will collect below the lower tier of pipes 32; but that is of no consequence.

A typical commercial installation embodying the present invention will have the following dimensions:

Storage tank 8—inside diameter—22 ft. (6.7 m).
Circumferential wall 9—height—17 ft. (5.18 m).
Settling tank outside wall 11—inside diameter—46 ft. (14 m).
Typical drop from ends of flow metering plate 23 to radius r-180—1 in.-1.5 in. (2.54 cm-3.81 cm).
Nominal diameter of elbow 16 and infeed elbows 18—12 in. (0.3048 m).
Rate of input—1800 gpm (6,813 lpm).
Approximate minimum distance liquid may travel from infeed to overflow—38 ft. (11.58 m).
Approximate velocity of liquid flow—0.914 ft./min. (27.86 cm/min.).
Approximate minimum travel time from infeed to overflow—42 min.
Assuming particles have a specific gravity of approximately 2.0, and all particles larger than about 16 microns settle out, the rate of particle accumulation for removal by the means 30 is about 2.4 cu.yd. (1.84 cu.m) per day.
Rate of removal of slurry by the means 30—up to about 200 gpm (757 lpm).
Average rate of removal of water from storage tank 8 is sufficient to maintain balance in the system.

With the foregoing apparatus dimensions and rate of throughput, the apparatus provides plug flow around both sides of the storage tank. In plug flow, particles pass through a tank and are discharged in the same sequence in which they enter, so that all parts of the body of liquid remain in the settling tank for about the same length of time and all suspended particles have substantially an equal opportunity to settle far enough for removal from the lower portion of the settling tank.

As a result, the apparatus provides better liquid clarification than is possible in a comparable period of time with other types of apparatus.

In addition, the apparatus requires a minimum head between the settling tank and the storage tank; so the storage and settling apparatus does not need to be elevated above ground level.

The foregoing detailed description is given for clearness of understanding only and no unnecessary limitations should be understood therefrom, as modifications will be obvious to those skilled in the art.

I claim:

1. A combined settling and liquid storage tank comprising, in combination:
    an inner cylindrical storage tank having a circumferential wall of larger diameter and depth;
    an outer annular settling tank concentrically surrounding said storage tank, said settling tank having a ratio of width to internal circumference which produces essentially plug flow;
    an infeed for introducing at very low velocity into the uppermost part of body of liquid in said outer annular settling tank a feed liquid containing suspended fine particles which may settle out of said feed liquid, said infeed occupying a small area in the vicinity of a line segment defining a zero radius of the settling tank;
    an overflow weir over which outflow liquid may pass at very low velocity from the upper part of said body of liquid directly into said inner storage tank, said weir surrounding no more than about half the circumference of the inner storage tank and being bisected by a line segment defining a 180° radius of the outer annular settling tank, and said weir comprising a flow metering plate which concentric with the inner storage tank circumferential wall;
    means for removing settled particles from the lower portion of the outer annular settling tank; and
    means for removing liquid from said inner storage tank.

2. The combination of claim 1 in which the circumferential wall of the inner storage tank defines the internal circumference of the outer annular settling tank.

3. The combination of claim 2 in which the outer annular settling tank has an outer wall the lower end portion of which is inclined toward the circumferential wall of the inner storage tank so the lower part of the settling tank is frustoconical.

4. The combination of claim 3 in which the means for removing settled particles from the lower portion of the outer annular settling comprises several pipes communicating with said lower portion of the outer annular settling tank through which a heavy slurry of liquid and settled particles may be withdrawn from said lower portion.

5. The combination of claim 4 in which there are pipes in two tiers and there are several pipes in each tier with a multiplicity of slurry withdrawal openings in each pipe.

6. The combination of claim 1 in which the outer annular settling tank has an outer wall the lower end portion of which is inclined toward the circumferential wall of the storage tank so the lower part of the outer annular settling tank is frustoconical.

7. The combination of claim 1 in which the means for removing outer annular settled particles from the lower portion of the settling tank comprises several pipes communicating with said lower portion of the outer annular settling tank through which a heavy slurry of liquid and settled particles may be withdrawn from said lower portion.

8. The combination of claim 7 in which there are pipes in two tiers and there are several pipes in each tier with a multiplicity of slurry withdrawal openings in each pipe.

9. The combination of claim 1 in which the weir includes a baffle concentric to and located radially outwardly of the flow metering plate so liquid can reach the weir only from below.

10. The combination of claim 9 in which the weir has an upper margin that is lowest at said 180° radius and increases gradually in height toward both its ends so as to maximize the distance to be traversed by liquid between the infeed and the overflow.

11. The combination of claim 10 in which the flow metering plate comprises several cooperating plate members each of which is individually adjustable to change both its height and its angle relative to the plane of the top margin of the circumferential wall.

12. The combination of claim 10 in which the weir surrounds a major part of half the circumference of the inner storage tank.

13. The combination of claim 1 in which the infeed comprises upright pipe means having a discharge end below the surface of the body of liquid in the outer annular settling tank, and baffle plate means operatively associated with said discharge end to spread the flow of liquid from the infeed laterally and reduce local currents tending to interfere with settlement of particles close to the infeed discharge end.

14. The combination of claim 13 in which the infeed comprises a plurality of pipes providing for balanced introduction of liquid in an area bisected by the zero radius of the outer annular settling tank.

15. The combination of claim 13 in which the outer annular settling tank has an outer wall the lower end portion of which is inclined toward the circumferential wall of the inner storage tank so the lower part of the outer annular settling tank is frustoconical, and the infeed pipe means is close to said circumferential wall of the inner storage tank.

16. The combination of claim 13 in which the weir has an upper margin that is lowest at said 180° radius and increases gradually in height toward both its ends so as to maximize the distance to be traversed by liquid between the infeed and the overflow.

17. The combination of claim 16 in which the flow metering plate comprises several cooperating plate members each of which is individually adjustable to change both its height and its angle relative to the plane of the top margin of the circumferential wall.

18. The combination of claim 17 in which the weir includes a baffle concentric to and located radially outwardly of the flow metering plate so liquid can reach the weir only from below.

19. The combination of claim 18 in which the weir surrounds a major part of half the circumference of the inner storage tank.

* * * * *